Dec. 30, 1941.  A. W. TUSTIN ET AL  2,268,359
RELIEF VALVE
Filed Aug. 2, 1939
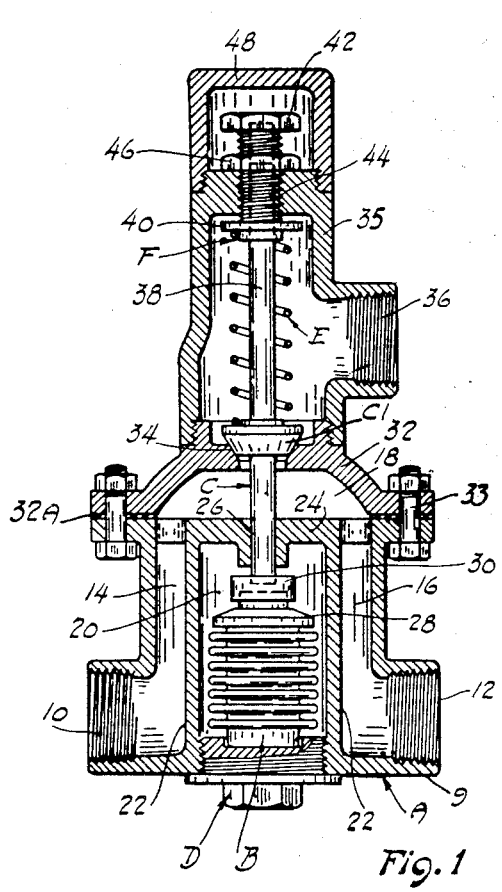
Fig. 1
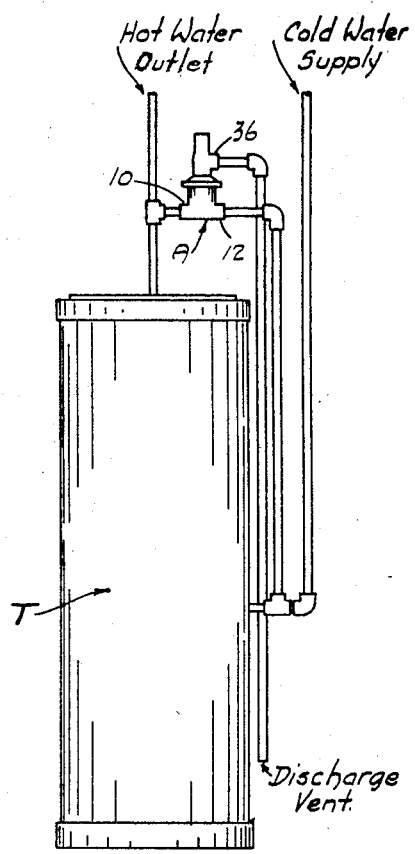
Fig. 4
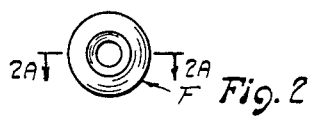
Fig. 2
Fig. 2A
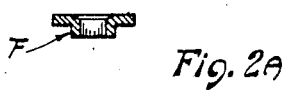
Fig. 3
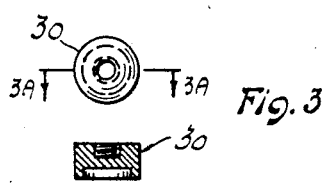
Fig. 3A
INVENTOR.
Albert W. Tustin
Frank L Gaus
BY
Harry Sangeam
ATTORNEY.

Patented Dec. 30, 1941

2,268,359

UNITED STATES PATENT OFFICE 2,268,359

RELIEF VALVE

Albert W. Tustin and Frank L. Gaus, Philadelphia, Pa.

Application August 2, 1939, Serial No. 287,918

1 Claim. (Cl. 137—53)

Our invention relates to a combined pressure and temperature relief valve.

It is an object of our invention to provide a valve that prohibits hot or boiling water from backing up into the cold water feed line to the tank which would cause considerable damage to water meters which may be in use.

Another object of our invention is to provide a valve having metallic bellows containing a liquid having a suitable vapor pressure at a desired temperature.

Another object of our invention is to provide a spring for holding the valve read in position, but which spring is normally out of contact with the circulating liquid.

Another object of our invention is to provide a valve having bellows which expands by virtue of the increasing temperature of the circulating liquid whereby the valve may be opened at a predetermined temperature to lower the tank pressure to a safe maximum value, thus, prohibiting the liquid contents in the tank from backing up into the cold water supply line.

Another object of our invention is to provide a valve having bellows which expand by the increasing temperature of the circulating liquid whereby the valve may be opened at a predetermined temperature to lower the tank temperature to a safe maximum.

Another object of our invention is to provide a combined temperature and pressure valve which will automatically close when the temperature and pipe pressure fall to safe values.

Another object of our invention is to provide metallic bellows as a thermostatic control which will not readily become damaged.

Other objects of our invention are to provide an improved device of the character described, that is easily and economically produced, which is sturdy in construction and which is highly efficient in operation.

With the above and related objects in view, our invention consists in the following details of construction and combination of parts, as will be more fully understood from the following description, when read in conjunction with the accompanying drawing, in which:

Fig. 1 is a sectional view through the entire valve.

Fig. 2 is a plan view of the spring engaging washer.

Fig. 2A is a sectional view taken on the line 2A—2A of Fig. 2.

Fig. 3 is a plan view of the connecting member located between the valve stem and the temperature expanding bellows.

Fig. 3A is a sectional view taken on the line 3A—3A of Fig. 3.

Fig. 4 is a side elevational view illustrating our invention connected to a water boiler.

Referring to the drawing, a casing, preferably of metal, is generally designated as A. The lower portion 9 of the casing has a threaded inlet passageway 10 and a threaded outlet passageway 12. An inlet port 14 and an outlet port 16 join a common central opening 18. The circulating liquid passes into passageway 10 through port 14 into chamber 18. then out through port 16 and exhaust passageway 12. Passageway 10 may be connected to the hot water outlet pipe of water tank T, and passageway 12 may be connected to the cold water inlet pipe of the water tank T.

By enclosing the bellows in a separate chamber 20, the operation of the bellows is dependent upon the conduction of heat through cylindrical wall 22, which is located in the interior of the casing A. This enclosure minimizes the deposit of sediment around the bellows and decreases the likelihood of corrosion of the bellows. Since the valve stem C makes a close sliding fit with the opening 26 in the top wall 24 of the chamber 20, the chamber is substantially leak-proof. However, a packing gland may be used around the opening if it is desired to make a liquid tight fit, but corrosion of the bellows is thus eliminated by keeping the bellows in a separate chamber. Under certain conditions, it may be found desirable to eliminate the separate enclosure for bellows.

The bellows B is preferably of the single or multiple ply seamless, hydraulically-formed type, which has been cold-worked and which may be made of brass, bronze, stainless steel, or other corrosive resisting metal material. Other types of bellows may be employed to perform the same operation, as, for example, the seamed, multi or single stage variety and/or the seamless type made by spinning or rolling either after it has been annealed or left in the cold-worked condition.

The bellows B is inserted or removed from the assembly by removing the close-fitting nut, generally designated as D, which has a plurality of facets on an outer extension so that it may be grasped by a wrench.

A heavy cap 28 fitting on the upper portion of the bellows has a circular extension thereon and serves to equalize the stress over the cross-sectional area of the bellows as well as to serve as a guide when a sliding engagement is made with the connector 30, which is a separate piece from the cap 28 and the stem C, but the cap 28 may be screw-threaded onto a complementary screw-threaded end of the stem C.

An intermediate housing 32 constitutes a portion of the casing A and is bolted by means of bolts and nuts 33 to the lower portion 9 of the casing A. The housing 32 has a valve seat 34 therein, which valve seat may have a ground surface, or it may have a seat of the replaceable type constructed of the same or of a dissimilar metal or fiber resin or other composition. A gasket 32A is used between the housing portions 9 and 32. In the upper portion of the housing A is a separate casing 35 which has an excess fluid vent 36 therein and which houses a valve Cl and a spring, generally designated as E.

A spring guide F is adapted to slide on the upper portion 38 of the valve stem, but the spring guide has a flange 40 which is stopped from moving by virtue of it engaging the spring E.

The compression adjustment of the spring E is made by turning a bolt 42 through a complementary threaded bore 44 in the housing 35, and the bolt 42 is fastened in position by a lock nut 46. The bolt 42 is of a larger diameter than the opening in the spring guide and bears against the spring guide, which also serves as a top seat for the spring E, which already has been explained. When the valve is in operation to relieve the boiler or tank of excessive temperature and/or pressure conditions, the circulating liquid flows up through the opening which is closed by the valve, and the liquid leaves through the vent or exhaust nipple 36, which is interiorly screw-threaded to receive a discharge pipe.

The housing 32 is preferably a separate member from the top portion of the housing to facilitate the grinding of the valve seat. However, under certain conditions, it may be desired to mold the top portion 35 of the casing to the center housing 32 as a single unit.

Cast brass or bronze or any other suitable material causing resistance to corrosion may be used as the housing; however, bronze and phosphor bronze is preferably used when the valve is to be installed in a hot water system.

A cap 48 is screwed upon the top of the portion 35 and serves to guard the valve from being actuated by unauthorized persons.

The spring E may be made of phosphorus spring bronze, beryllium copper, or stainless steel.

As a safety device for hot water systems, it is preferable to limit the operating pressure to 100 lbs. per square inch and 212° F., although 600 lbs. per square inch is the maximum pressure that it is practical to design Sylphon metallic bellows.

It is particularly to be noted that with this arrangement, the pressure of the water tends to lift the valve Cl off its seat 34 against the tension of the spring E, which acts to force the valve on its seat. In the event the pressure is a normal pressure but the temperature of the water will become excessive, the bellows B will expand against the valve stem C, thereby raising the valve from its seat 34, thereby enabling the water to pass through the exhaust 36.

The invention can be installed by connecting it near an automatic gas heater so that the pressure and temperature relief valve is connected to the cold water inlet and the hot water outlet.

A similar type arrangement of the valve may be made with any other type of storage tank, and it should be particularly noted that the valve need not be attached inside the tank but only to pipes adjacent the tank.

When the valve is opened, the pressure within the storage tank will not exceed the pressure of the incoming fluid. However, the valve which usually is set to be actuated at a predetermined pressure can be actuated by the expansion of the liquid in the bellows, and the liquid in the bellows should be of a type that will expand readily to expand the bellows and also to actuate the valve.

Although our invention has been described in considerable detail, such description is intended as illustrative rather than limiting, since the invention may be variously embodied, and the scope of the invention is to be determined as claimed.

We claim as our invention:

A combined pressure and temperature relief valve comprising a lower housing section having inlet and outlet passages therethrough and a thermostatic chamber adjacent but out of communication with said passages, a thermostat in said chamber, an intermediate housing section mounted on the upper portion of said lower section providing communication between said passages, an upper section mounted on the upper portion of said intermediate section and having a pressure exhaust port leading therefrom, a valve port in the intermediate section providing communication between the said intermediate section and said upper section, a spring-seated valve member controlling said port, a stem on said valve projecting through said intermediate chamber and into the thermostatic chamber to cooperate with the thermostat to open the valve member upon excessive rise in temperature of the fluid flowing through the lower housing section, said valve member being further adapted to open against the spring pressure to relieve excessive pressure conditions of the fluid flowing through the said lower section.

ALBERT W. TUSTIN.
FRANK L. GAUS.